US009521134B2

(12) United States Patent
Chung et al.

(10) Patent No.: US 9,521,134 B2
(45) Date of Patent: Dec. 13, 2016

(54) CONTROL APPARATUS IN SOFTWARE DEFINED NETWORK AND METHOD FOR OPERATING THE SAME

(71) Applicant: Atto Research Co., Ltd., Seongnam (KR)

(72) Inventors: Jae Woong Chung, Seoul (KR); Seung Won Shin, Daejeon (KR); Yong Joo Song, Seongnam (KR)

(73) Assignee: ATTO RESEARCH CO., LTD., Seongnam (KR)

( * ) Notice: Subject to any disclaimer, the term of this patent is extended or adjusted under 35 U.S.C. 154(b) by 0 days.

(21) Appl. No.: 14/711,544

(22) Filed: May 13, 2015

(65) Prior Publication Data
US 2016/0337330 A1 Nov. 17, 2016

(51) Int. Cl.
*H04L 29/06* (2006.01)
*H04L 12/931* (2013.01)
*H04L 12/26* (2006.01)

(52) U.S. Cl.
CPC .............. *H04L 63/08* (2013.01); *H04L 43/10* (2013.01); *H04L 49/35* (2013.01)

(58) Field of Classification Search
CPC ................................ H04L 43/10; H04L 49/35
See application file for complete search history.

(56) References Cited

U.S. PATENT DOCUMENTS

| | | | | |
|---|---|---|---|---|
| 8,082,342 B1* | 12/2011 | Stolboushkin | ...... | H04L 12/2602 709/203 |
| 8,151,269 B1* | 4/2012 | Brown | .............. | G06F 17/30306 707/713 |
| 2007/0220519 A1* | 9/2007 | Koike | ..................... | G06F 9/542 718/102 |
| 2008/0148390 A1* | 6/2008 | Zimmer | .................. | G06F 21/51 726/17 |
| 2009/0048933 A1* | 2/2009 | Cho | .................... | G06Q 30/0257 705/14.55 |
| 2009/0161921 A1* | 6/2009 | Ohnishi | ............. | G06K 9/00771 382/115 |
| 2012/0131682 A1* | 5/2012 | Kim | ........................ | G06F 21/10 726/28 |
| 2012/0150581 A1* | 6/2012 | Mcphail | ................. | G06Q 10/10 705/7.19 |
| 2012/0166869 A1* | 6/2012 | Young | ................... | G06F 11/008 714/15 |
| 2013/0218574 A1* | 8/2013 | Falcon | .................... | G10L 15/22 704/275 |
| 2013/0275987 A1* | 10/2013 | Meijer | .................... | G06F 9/466 718/103 |
| 2013/0339079 A1* | 12/2013 | Benayon | .......... | G06Q 10/06315 705/7.25 |

(Continued)

*Primary Examiner* — Hadi Armouche
*Assistant Examiner* — Ali Shayanfar

(57) ABSTRACT

A control apparatus which manages a software defined network including a plurality of switches includes a security management module that authenticates at least one application program, and an application program management module that executes the authenticated application program among the at least one application program in a first process, and executes the application program whose authentication fails in a second process. The application program management module may be executed in the first process, and the first process may be different from the second process.

9 Claims, 6 Drawing Sheets

(56) References Cited

U.S. PATENT DOCUMENTS

| | | | |
|---|---|---|---|
| 2014/0298453 A1* | 10/2014 | Heng | G06F 21/552 726/22 |
| 2014/0330896 A1* | 11/2014 | Addala | G06F 17/3089 709/203 |
| 2015/0244765 A1* | 8/2015 | Bellessort | H04L 67/322 709/203 |
| 2015/0293796 A1* | 10/2015 | Wang | G06F 9/542 719/318 |

* cited by examiner

CONTROL APPARATUS IN SOFTWARE DEFINED NETWORK AND METHOD FOR OPERATING THE SAME

BACKGROUND OF THE INVENTION

1. Field of the invention

The present invention relates to a control apparatus in a software defined network and a method for operating the same.

2. Description of the Prior Art

The emergence of software defined networking technologies which were announced in 2008 have recently changed the network structure. The software defined networking technologies basically separate a complex function of a control plane from a data plane so that the complex function of the control plane may be processed in a software manner and the data plane may perform only simple functions of transmission, disregard, change, etc. of a network packet. In this case, a new network function can be developed in a software manner by the aid of the control plane without complex hardware constraints, and at the same time, a variety of attempts which are difficult to be made in the previous network structure become possible.

For example, in an environment such as a cloud network, the function of each network switch or router may be dynamically set to reduce the energy consumption, and in an enterprise-class environment, a desired access control method may be implemented in each switch or router. Thus, using this method, it is possible to reduce the number of devices used in the existing network and also reduce device management costs. In addition, it is possible to freely and experimentally develop and test a new function.

Switches within a software defined network are not required to have a simple structure, as opposed to a general network including switches connected in a simple structure for management convenience. This is because a control apparatus can obtain a flow table of the switches by the high-speed computing.

In this manner, the switch in the software defined network merely follows instructions of the control apparatus, and all functions of the software defined network may be implemented by the control apparatus. Thus, the control apparatus largely contributes to the implementation of the software defined network, and therefore there are demands for a scheme for providing high-performance, stability, and security to the control apparatus.

SUMMARY OF THE INVENTION

The present invention has been made in order to solve the above-mentioned problems in the prior art and an aspect of the present invention is to provide a control apparatus that has high-performance, stability, and security in a software defined network.

In order to accomplish these objects, there is provided a control apparatus which manages a software defined network including a plurality of switches, including: a security management module that authenticates at least one application program; and an application program management module that executes the authenticated application program among the at least one application program in a first process, and executes the application program whose authentication fails in a second process. The application program management module may be executed in the first process, and the first process may be different from the second process.

The control apparatus may further include an event queue that queues a plurality of events; and an event distribution module that determines the event to be preferentially processed among the plurality of events based on a priority assigned to a type of the determined event, and distributes the determined event to the application program to process the determined event.

As described above, according to the embodiments of the present invention, the control apparatus may have high-performance, stability, and security.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
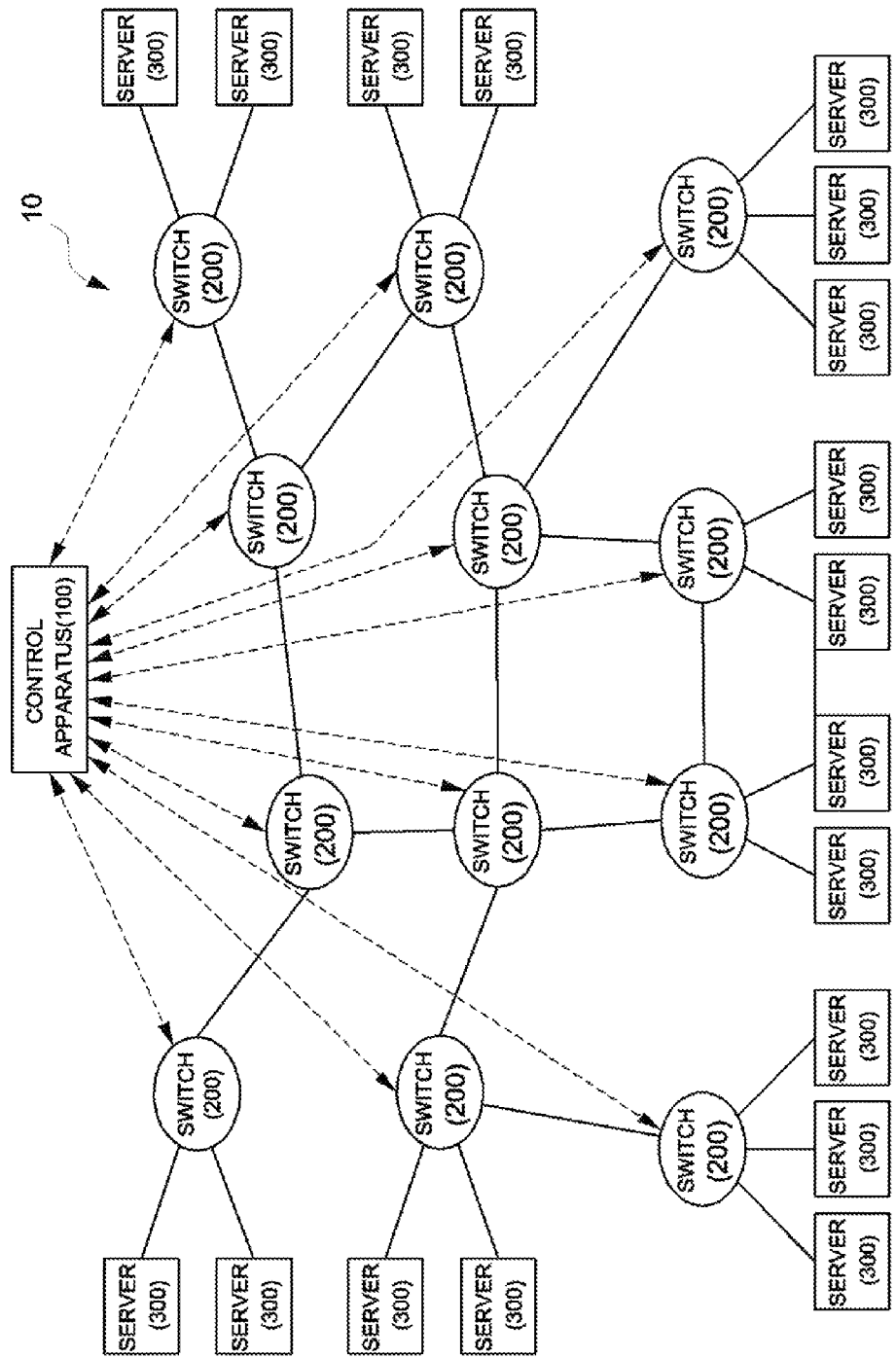
FIG. 1 is a block diagram illustrating a basic structure of a software defined network according to an exemplary embodiment of the present invention.

Hereinafter, exemplary embodiments of the present invention will be described in detail with reference to the accompanying drawings so that those skilled in the art may easily carry out the present invention. However, the present invention may be implemented in various different forms and is not limited to embodiments described herein. Further, parts irrelevant to the present invention are omitted in the drawings to make the present invention clear and the same reference numerals are designated to the same or similar components throughout the specification.

In the entire specification of the present application, when it is described that a certain unit "includes" a certain element, this means that the unit may include any other element rather than exclude the any other element unless otherwise described.

FIG. 1 is a block diagram illustrating a basic structure of a software defined network according to an exemplary embodiment of the present invention.

As illustrated in FIG. 1, the software defined network 10 according to an embodiment of the present invention includes a control apparatus 100, a plurality of network switches 200, and a plurality of servers 300. A single control apparatus 100 manages the plurality of network switches 200.

Hereinafter, as a concept that covers the control apparatus 100, the plurality of network switches 200, and the plurality of servers 300, the term "node" is used. A link refers to a connection between two nodes. A flow refers to a series of links. As a concept that covers the plurality of network switches 200, the link, and the flow, the term "network element" is used.

The server 300 generates a packet to be transmitted to another server, and transmits the generated packet to the switch 200 via a port of a network interface.

The switch 200 switches the packet based on a flow table when receiving the packet from the server 300 or another switch. In this instance, when the flow table does not have a flow entry for packet switching, the switch 200 transmits an event or a flow rule request message to the control apparatus 100. The control apparatus 100 manages the flow tables of the plurality of switches 200.

Next, the structure of the control apparatus 100 according to an embodiment of the present invention will be described with reference to FIG. 2.

Figure 2:
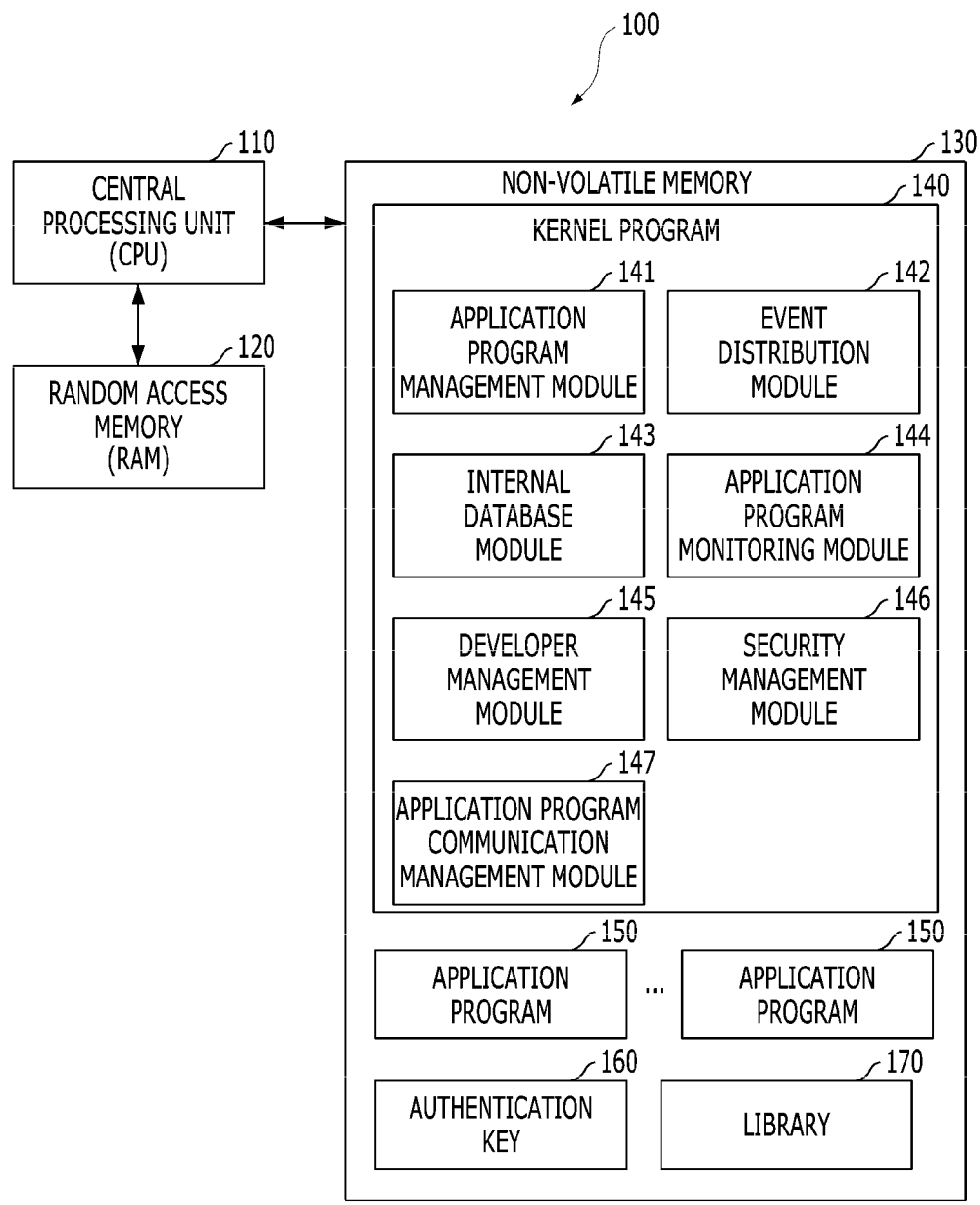
FIG. 2 is a block diagram illustrating a structure of a control apparatus according to an exemplary embodiment of the present invention.

FIG. 2 is a block diagram illustrating a structure of a control apparatus according to an exemplary embodiment of the present invention.

As illustrated in FIG. 2, the control apparatus 100 according to an embodiment of the present invention includes a central processing unit 110, a random access memory 120, and a non-volatile memory 130.

The non-volatile memory 130 stores a kernel program 140, one or a plurality of application programs 150, an authentication key 160, and a library 170.

The kernel program 140 includes an application program management module 141, an event distribution module 142, an internal database module 143, an application program monitoring module 144, a developer management module 145, a security management module 146, and an application program communication management module 147. The plurality of modules within the kernel program 140 may be manufactured by a single program or a plurality of individual programs.

The central processing unit 110 loads the corresponding program to the random access memory 120 stored in the non-volatile memory 130, and operates the corresponding program by performing instructions of the corresponding program.

Examples of the random access memory 120 may include a DRAM (Dynamic random-access memory) and a DDR SDRAM (Double data rate synchronous dynamic random-access memory).

Examples of the non-volatile memory 130 may include a hard disk and a flash memory.

The application program management module 141 actually executes and manages the application programs and adjusts and distributes resources (memory, CPU, etc.) to each application program, so that the application programs may be smoothly operated independently from one another.

The event distribution module 142 distributes an event including requirements transmitted from a data plane (a set of network switches) to the application program using an event queue. The event distribution module 142 may distribute the event in consideration of a priority of the application program. Thus, the event may be first distributed to an important application program in a discriminative manner.

The internal database module 143 stores information generated from the control apparatus 100 so that the application program or other modules may use the stored information.

The application program monitoring module 144 checks whether there is a problem in the operation of the application program while monitoring a state of the application program, and collects and records information about the problem when there is the problem. In addition, the application program monitoring module 144 may also monitor and record information about the resource used by each application program.

The developer management module 145 provides information about the control apparatus 100 to developers who develop the application programs. When an external management tool such as GUI is manufactured, the developer management module 145 may provide information required for the tool.

The security management module 146 may analyze a security and authentication setting file to confirm whether the application program is actually authenticated, and execute the application program when the application program is authenticated.

When the application program is not authenticated, the security management module 146 may interrupt the execution of the corresponding application program, or execute the corresponding application program in another process other than a process in which a kernel program is executed. When the corresponding application program violates a security setting during the operation of the application program, the security management module 146 may perform countermeasures of warning, interruption, or the like.

The application program communication management module 147 may support communication between the plurality of application programs 150.

The authentication key 160 may be used to authenticate the application program 150.

The library 170 aids programming of the application program 150, and is used by the application program 150.

Next, a hierarchical structure of a program within the control apparatus 100 according to an exemplary embodiment of the present invention will be described in detail with reference to FIG. 3.

Figure 3:
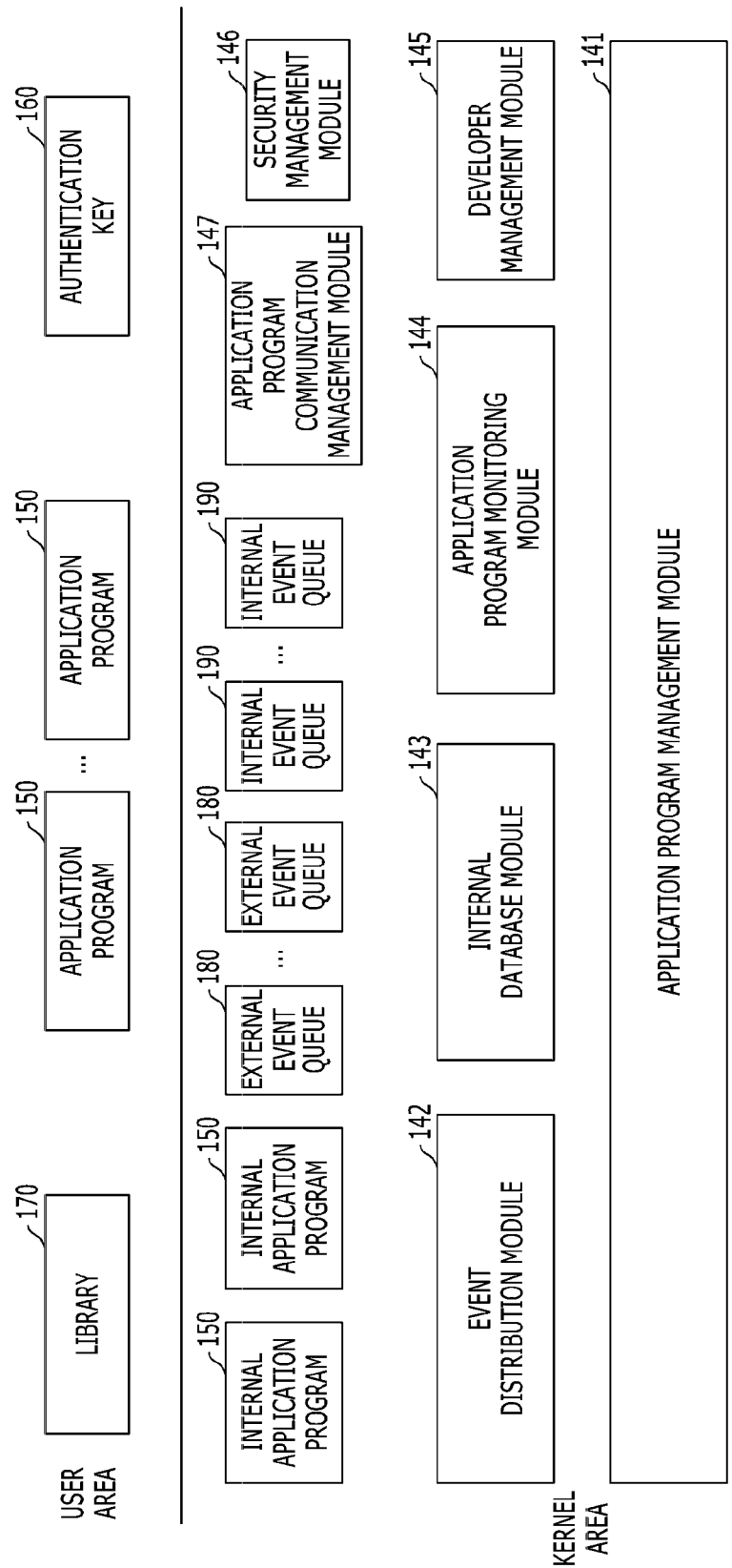
FIG. 3 is a diagram illustrating a hierarchical structure of a program within a control apparatus according to an exemplary embodiment of the present invention.

FIG. 3 is a diagram illustrating a hierarchical structure of a program within a control apparatus according to an exemplary embodiment of the present invention.

As illustrated in FIG. 3, the control apparatus 100 includes a kernel area and a user area.

The kernel area includes an application program management module 141, an event distribution module 142, an internal database module 143, an application program monitoring module 144, a developer management module 145, a security management module 146, an application program communication management module 147, an internal application program 150, at least one external event queue 180, and at least one internal event queue 190. The modules and programs within the kernel area may be executed in a single process (hereinafter, referred to as "kernel process").

The external event queue 180 queues an event caused from the outside of the control apparatus 100. Specifically, the external event queue 180 may queue an event that occurs in the switch 200.

The internal event queue 190 queues an event caused from the inside of the control apparatus 100. Specifically, the internal event queue 190 may queue an event that occurs in the application program 150 or the several modules inside the control apparatus 100.

The user area includes an application program 150, a library 170, and an authentication key 160. Programs within the user area may be executed in each of a plurality of processes (hereinafter, referred to as "user process").

Next, a structure of the switch 200 according to an embodiment of the present invention will be described with reference to FIG. 4.

Figure 4:
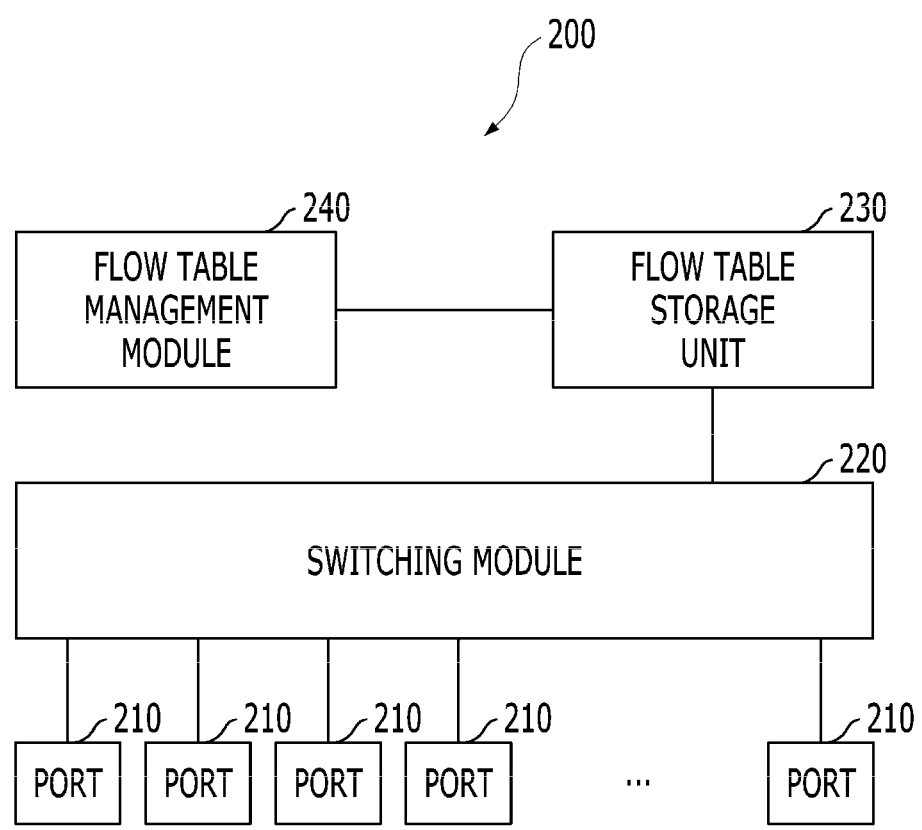
FIG. 4 is a block diagram illustrating a structure of a switch according to an exemplary embodiment of the present invention.

FIG. 4 is a block diagram illustrating a structure of a switch according to an exemplary embodiment of the present invention.

As illustrated in FIG. 4, the switch 200 according to an embodiment of the present invention includes a plurality of ports 210, a switching module 220, a flow table storage unit 230, and a flow table management module 240.

The flow table storage unit 230 has a flow table.

The switching module 220 performs packet switching based on the flow table. In this instance, when receiving a packet via one port of the plurality of ports 210, the switching module 220 determines via which port the received packet among the plurality of ports 210 is to be output based on the flow table, and outputs the received packet via the determined port.

The flow table management module 240 confirms whether the flow table of the flow table storage unit 230 is required to be updated, and corrects the flow table in response to a flow table correction request from the control apparatus 100.

Next, a method for operating the control apparatus 100 according to an embodiment of the present invention will be described with reference to FIG. 5.

Figure 5:
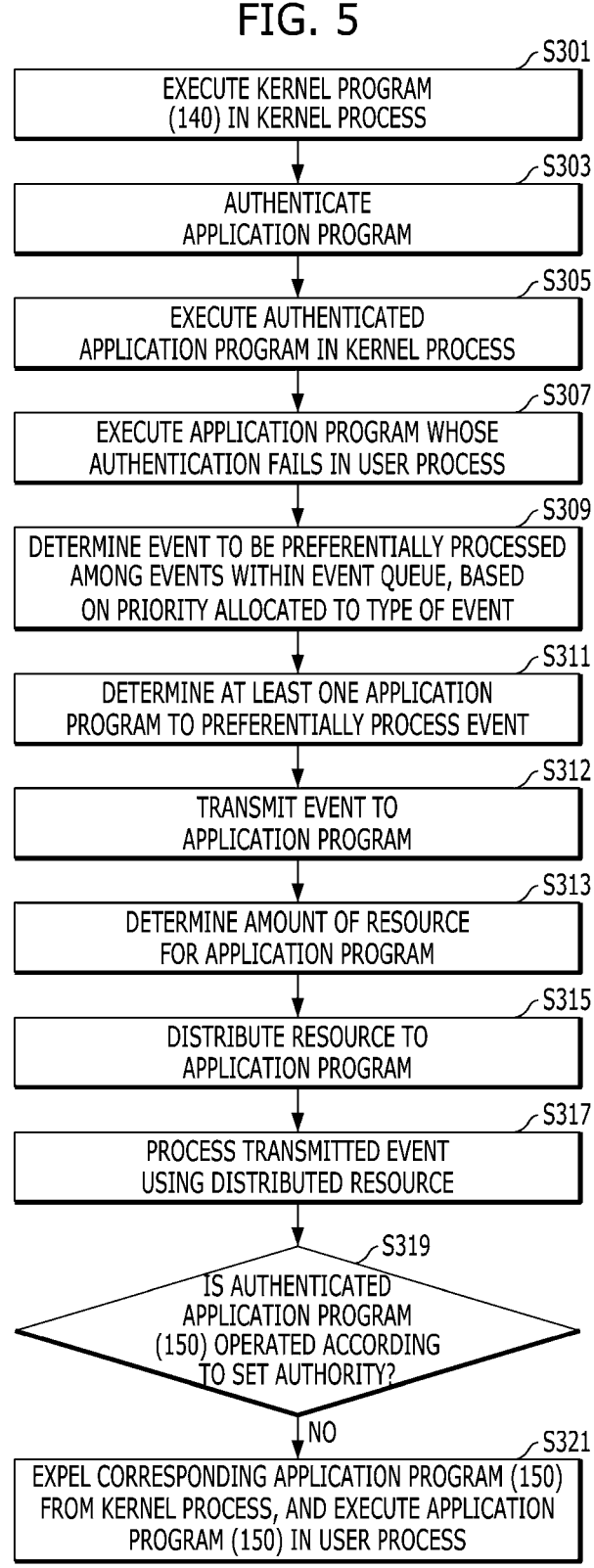
FIG. 5 is a flowchart illustrating a method for operating a control apparatus according to an exemplary embodiment of the present invention.

FIG. 5 is a flowchart illustrating a method for operating a control apparatus according to an exemplary embodiment of the present invention.

In operation S301, when booted, the control apparatus 100 executes a kernel program 140 in a kernel process. The central processing unit 110 of the control apparatus 100 may upload the kernel program 140 to the random access memory 120 and execute the kernel program 140.

In operation S303, the security management module 146 of the kernel program 140 authenticates at least one application program. The security management module 146 of the kernel program 140 may authenticate the at least one application program using the authentication key 160. The authentication key 160 may include information for checking modulation of the application program 150 and information for checking a change in the authority of the application program 150. The security management module 146 of the kernel program 140 may authenticate the application program 150 using the authentication key 160, thereby checking the modulation of the application program 150 and checking the change in the authority of the application program 150. When it is confirmed that the application program 150 has been modulated, the security management module 146 of the kernel program 140 may fail to authenticate the application program 150. When it is confirmed that the authority of the application program 150 has been changed, the security management module 146 of the kernel program 140 may fail to authenticate the application program 150. When it is confirmed that the application program 150 has been not modulated and the authority of the application program 150 has been not changed, the security management module 146 of the kernel program 140 may succeed in authentication of the application program 150.

In operation S305, the application program management module 141 of the kernel program 140 executes at least one authenticated application program among at least one application program in the kernel process. Here, the application program management module 141 may execute, in the kernel process, the authenticated application program that is predicted to prevent system instability of the control apparatus 100 from being provided and is not hacked, thereby increasing an operation speed of the authenticated application program, and reducing resource consumption of the authenticated application program. Thus, the control apparatus 100 may have high-performance, stability, and security.

In operation S307, the application program management module 141 of the kernel program 140 executes at least one application program whose authentication fails among the at least one application program, in the user process. A plurality of application programs whose authentication fails may be respectively executed in a plurality of user processes. Through this, even when a single user process is down, the other application programs are normally operated, and therefore it is possible to prevent the down of the whole of the control apparatus 100.

In operation S309, the event distribution module 142 of the kernel program 140 determines an event to be preferentially processed among events within an event queue, based on a priority allocated to a type of the event. The event distribution module 142 may determine an event with the highest priority among the events within the event queue as the event to be processed, based on the type of the event. For example, the event distribution module 142 may determine the event to be processed according to the priority shown in the following Table 1.

TABLE 1

| Priority | Type of event |
|---|---|
| 1 | Packet_in |
| 2 | Connection_down |
| 3 | Topology_change |
| 4 | Stat_in |
| 5 | Connection_up |

In Table 1, when a new flow having no flow table is generated, a packet inflow (packet_in) event is generated. When the network switch 200 is down due to turn-off or an error of the network switch 200, a connection down (connection_down) event is generated. When topology is required to be changed, a topology change (topology_event) event is generated. When statistics are required to be collected, a statistic collection (stat_in) event is generated. When the network switch 200 that has been down is up due to turn-on or elimination of the error of the network switch 200, a connection up (connection_up) event is generated.

In operation S311, the event distribution module 142 of the kernel program 140 determines at least one application program to preferentially process the determined event.

According to an embodiment, when determining the plurality of application programs in order to process the corresponding event, the event distribution module 142 may determine the application program to preferentially process the corresponding event among the plurality of application programs, based on a priority allocated to a type of the application program.

TABLE 2

| Priority | Type of application program | Example of application program |
|---|---|---|
| 1 | Manager program | |
| 2 | Network security program | Firewall, DDos Shield |
| 3 | Routing program | |
| 4 | User program | UI program, statistic program |

In Table 2, a manager program may support a manager to forcibly issue a command to the software defined network 10. The network security program may support to provide network security to the software defined network 10. In particular, a firewall program of a network security program may support to install a firewall in the software defined network 10. A DDoS Shield program of the network security program may support to install DDoS Shield in the software defined network 10. A routing program may support correction and management of the flow table. A user program may support briefing of the state of the software defined network 10 to a user.

According to an embodiment, when determining the plurality of application programs in order to process the corresponding event, the event distribution module 142 of the kernel program 140 may determine the application program to preferentially process the corresponding event among the plurality of application programs, based on a priority allocated to the application program. For example, the firewall program and the DDoS Shield program have the same type of the application program, but a priority of the firewall program may be assigned in such a manner that the priority of the firewall program is higher than the priority of the DDoS Shield program.

According to an embodiment, when determining the plurality of application programs in order to process the corresponding event, the event distribution module 142 of the kernel program 140 may determine the application program to preferentially process the corresponding event among the plurality of application programs, based on both the priority allocated to the type of the application program and the priority allocated to the application program. In this instance, the type of the application program may be considered first, and the priority allocated to the application program may be considered later. For example, the priority allocated to the type of the application program of the firewall program is higher than the priority allocated to the type of the application program of a UI program even though the priority of the UI program is higher than the priority of the firewall program, and therefore the firewall program may be determined to be an application program to preferentially process the corresponding event.

In operation S312, the event distribution module 142 of the kernel program 140 transmits the determined event to the determined application program.

In operation S313, the application program management module 141 of the kernel program 140 determines an amount of resources for the application program, based on at least one of the priority allocated to the type of the event transmitted to the application program, the priority allocated to the type of the application program that uses the transmitted event, the state of the network, and the priority allocated to the application program. In this instance, the resources may include at least one of occupancy of the central processing unit 110 and an amount of the random access memory 120.

In operation S315, the application program management module 141 of the kernel program 140 distributes the determined amount of resources to the application program.

In operation S317, the application program 150 processes the transmitted event using the distributed resources. The application program 150 may process the transmitted event using the library 170. In this instance, the application program 150 may process the event by communicating with other application programs, and the application program communication management module 147 may support the application program 150 to communicate with the other application programs.

When the packet inflow (packet_in) event is transmitted, the application program 150 may generate a flow rule for the flow of the packet corresponding to the packet inflow (packet_in) event, and provide the generated flow rule to the switch corresponding to the packet inflow (packet_in) event.

When the connection down (connection_down) event is transmitted, the application program 150 may generate a flow rule for bypassing the switch 200 corresponding to the connection down event, and provide the generated flow rule to the switch 200 corresponding to the generated flow rule.

When the topology change (topology_event) event is transmitted, the application program 150 may generate a flow rule corresponding to the topology change event, and provide the generated flow rule to the switch 200 corresponding to the generated flow rule.

When the statistic collection (stat_in) event is transmitted, the application program 150 may collect state information of the software defined network 10. When detecting the down of the switch 200 by analyzing the collected state information, the application program 150 may generate the connection down event.

When the connection up (connection_up) event is transmitted, the application program 150 may generate a flow rule that is used by the switch 200 corresponding to the connection up event, and provide the generated flow rule to the switch 200.

In operation S319, the application program monitoring module 144 monitors whether the authenticated application program 150 executed in the kernel process is operated according to a set authority. A variety of authorities may be set in the application program 150. In particular, in the application program 150, an event allowable range may be set as the authority. In this instance, as shown in Table 3, the event allowable range may include an event input allowable range and an event output allowable range. When the application program 150 processes an event outside the event allowable range, the application program monitoring module 144 may determine that the corresponding application program 150 is operated beyond the set authority. Specifically, when the application program 150 outputs an event outside the event output allowable range, the application program monitoring module 144 may determine that the corresponding application program 150 is operated beyond the set authority. When an event outside the event input allowable range is input to the application program 150, the application program monitoring module 144 may determine that the corresponding application program 150 is operated beyond the set authority.

TABLE 3

| Priority | Type of event | Input authority | Output authority |
|----------|---------------|-----------------|------------------|
| 1 | Packet_in | ○ | X |
| 2 | Connection_down | ○ | ○ |
| 3 | Topology_change | X | ○ |
| 4 | Stat_in | X | X |
| 5 | Connection_up | ○ | X |

In operation S321, when it is determined that the authenticated application program 150 executed in the kernel process is operated beyond the set authority, the application program management module 141 determines that authentication of the corresponding application program 150 fails, and expels the corresponding application program 150 from the kernel process, thereby executing the corresponding application program 150 in the user process.

Next, generation and processing of the packet inflow (packet in) event according to an embodiment of the present invention will be described with reference to FIG. 6.

Figure 6:
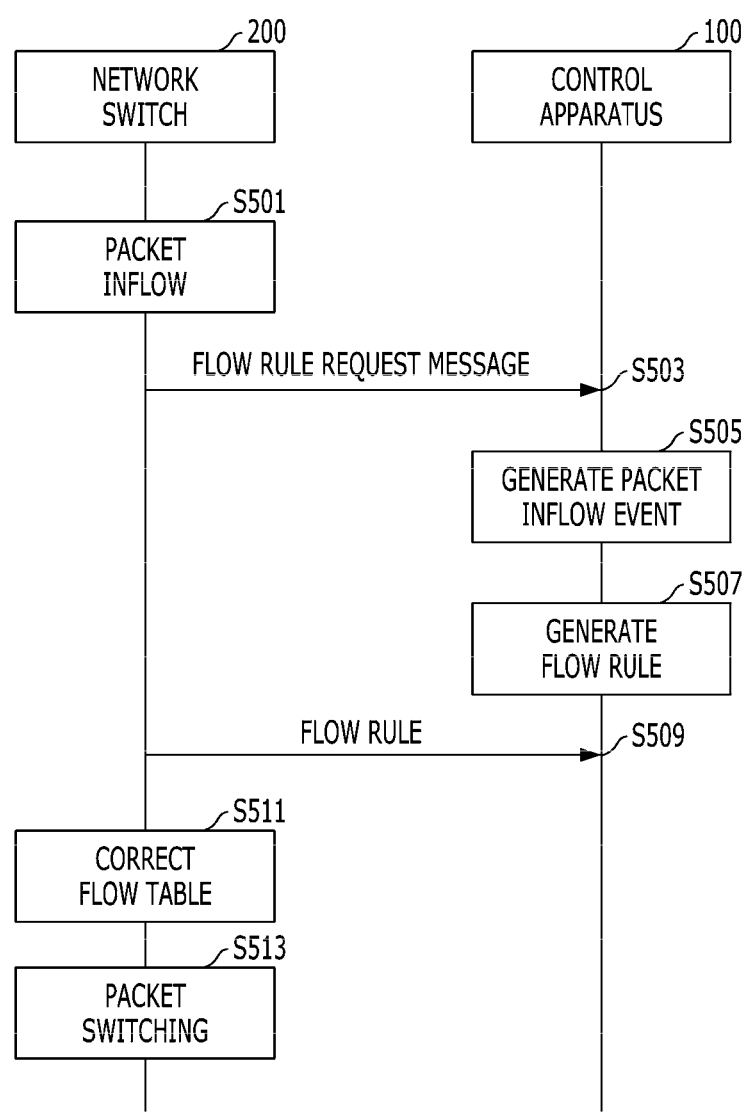
FIG. 6 is a ladder diagram illustrating an operation of a software defined network according to an exemplary embodiment of the present invention.

FIG. 6 is a ladder diagram illustrating an operation of a software defined network according to an exemplary embodiment of the present invention.

When a packet that is not described in the flow table flows into the network switch 200 in operation S501, the flow table management module 240 of the network switch 200 transmits a flow rule request message requesting the flow rule of the corresponding packet to the control apparatus 100 in operation S503. In this instance, the flow rule may be the flow table.

In operation S505, when receiving the flow rule request message requesting the flow rule of the flowing-in packet, the event distribution module 142 of the control apparatus 100 generates the packet_in event and stores the generated event in the external event queue 180. When the Packet_in event is required to be processed, the event distribution module 142 transmits the Packet_in event to the application program (e.g., a routing program) to process the Packet_in event.

The application program 150 of the control apparatus 100 generates a flow rule to be applied to the flow of the packet corresponding to the Packet_in event in operation S507, and transmits the generated flow rule to the network switch 200 in operation S509.

In operation S511, the flow table management module 240 of the network switch 200 corrects its own flow table based on the flow rule.

Next, in operation S513, the switching module 220 of the network switch 200 performs packet switching based on the corrected flow table.

Specifically, the switching module 220 may find a flow entry having a matching field satisfied by the flowing-in packet, and perform an action of the flow entry with respect to the flowing-in packet, and increase a counter. In this instance, the action may indicate via which port the flowing-in packet is to output.

In the above, the terms "kernel program" and "application program" have been used. In particular, the kernel program of the present invention may be a kernel program of a network operating system (OS) for enabling an apparatus having a CPU and a memory to be operated as the control apparatus of the software defined network. In this instance, after a typical OS such as Windows or Linux is executed, the network OS may be executed on the typical OS, as a single application program. The above-described application program may be executed on the network OS. According to the embodiment of the present invention, the network OS that is a single program for the typical OS may execute programs in the kernel process or the user process. In particular, the kernel program of the network OS may be executed in the kernel process of the network OS, the application program whose authentication fails among the application programs of the network OS may be executed in the user process of the network OS, and the authenticated application program may be executed in the kernel process of the network OS. In this manner, the kernel program of the network OS may be different from the kernel program of the typical OS.

The above-described embodiments of the present invention may not be implemented only through the apparatus and the method, and may be implemented through a program that realizes the function corresponding to the configuration of the embodiment of the present invention or a recording medium in which the program is recorded. Such implementation may be easily carried out by those skilled in the art.

Although specific embodiments of the present invention have been described above, it will be apparent to those skilled in the art that the scope of the present invention is not limited to the above-described embodiments, and various modifications and modified forms may be made using the basic concept of the present invention without departing from the scope of the present invention.

What is claimed is:

1. A method for operating a control apparatus which manages a software defined network including a plurality of switches, the method comprising:
   authenticating at least one application program;
   executing, by an application program management module, the authenticated application program among the at least one application program in a first process;
   executing, by the application program management module, the application program whose authentication fails in a second process;
   monitoring whether the authenticated application program executed in the first process is operated according to a set event authority or a set resource authority; and
   determining that authentication on the monitored application program fails when the authenticated application program is operated beyond the set event authority or the set resource authority as a result of the monitoring, and, if the authentication on the monitored application program fails, performing an operation corresponding to the set event authority or the set resource authority with respect to the monitored application program,
   wherein the first process is different from the second process, and
   wherein the method further comprises:
   queuing a plurality of events;
   determining an event to be processed among the plurality of events based on a priority assigned to a type of the determined event; and
   distributing the determined event to an application program to process the determined event.

2. The method of claim 1, wherein the method further comprises determining the application program to process the determined event based on a priority allocated to a type of the determined application program.

3. The method of claim 2, wherein determining the application program comprises determining the application program to process the determined event based on a priority allocated to the at least one application program and the priority allocated to the type of the determined application program.

4. The method of claim 2, wherein determining the application program further comprises determining an amount of resource for the determined application program based on the priority allocated to the type of the determined event, and distributing the determined amount of resource to the determined application program.

5. The method of claim 2, wherein determining the application program further comprises determining an amount of resource for the determined application program based on the priority allocated to the type of the determined application program to process the determined event, and distributing the determined amount of resource to the determined application program.

6. The method of claim 2, wherein determining the application program further comprises determining an amount of resource for the determined application program based on the priority allocated to the determined application program to process the determined event, and distributing the determined amount of resource to the determined application program.

7. The method of claim 1, wherein the set authority includes an event allowable range.

8. The method of claim 1, wherein the method comprises respectively executing a plurality of application programs whose authentication fails in a plurality of processes, each of the plurality of processes being different from the first process.

9. The method for operating the control apparatus of claim 1, wherein the performing of the operation includes performing at least one of expulsion of the monitored application program from the first process, interruption to the monitored application program, and warning about the monitored application program.

* * * * *